EMMETT N. LEITH
JURIS UPATNIEKS
*INVENTORS*

EMMETT N. LEITH
JURIS UPATNIEKS
INVENTORS

EMMETT N. LEITH
JURIS UPATNIEKS
INVENTORS

EMMETT N. LEITH
JURIS UPATNIEKS
INVENTORS

April 14, 1970    E. N. LEITH ET AL    3,506,327
WAVEFRONT RECONSTRUCTION USING A COHERENT REFERENCE BEAM
Filed April 23, 1964                           5 Sheets-Sheet 5

EMMETT N. LEITH
JURIS UPATNIEKS
INVENTORS

BY Gray, Mase, and
Dunson, Attorneys

United States Patent Office 3,506,327
Patented Apr. 14, 1970

3,506,327
WAVEFRONT RECONSTRUCTION USING A
COHERENT REFERENCE BEAM
Emmett N. Leith, Plymouth, and Juris Upatnieks, Ann
Arbor, Mich., assignors, by mesne assignments, to
The Battelle Development Corporation, Columbus,
Ohio, a corporation of Ohio
Filed Apr. 23, 1964, Ser. No. 361,977
Int. Cl. G02b 5/08
U.S. Cl. 350—3.5                    24 Claims

ABSTRACT OF THE DISCLOSURE

The method of and apparatus for constructing and reconstructing holograms of the off-axis type wherein coherent radiation is directed onto an object to provide an object-bearing beam in the path of which is positioned a detector sensitive to the coherent radiation. Radiation coherent with the first-named coherent radiation is directed as a reference beam onto the detector at a finite angle with respect to the object-bearing beam to produce therewith a pattern of interference fringes on the detector in the form of a hologram. The pattern is illuminated with coherent radiation as an illuminating beam, thereby producing an image of the object, and the image is detected along an axis angularly displaced from the illuminating beam.

---

This invention concerns methods and apparatus for producing images without requiring the use of lenses. More particularly, it relates to methods and apparatus for producing interference fringe patterns (i.e., holograms) and reconstructing the interference fringe pattern to produce one or more images.

The usual method of producing images is by using lenses, or groups of lenses, whereby a light ray is bent or refracted when it strikes the boundary between two transparent substances. In most instances, the two transparent substances are air and a form of glass. The laws that explain the phenomena of reflction and refraction are grouped under a field of study known as geometrical optics. There are other interesting characteristics of light, and the explanation of these depends on the assumption that light consists of waves. The effects that depend upon the wave character of light are classified under the field known as "physical" optics. Although this invention is based upon principles of both geometrical and physical optics, the explanation of the basic concepts is, in general, to be found in the field of physical optics.

The problem of producing clear images, 3-dimensional images, colored images, enlarged images, etc., has long been attacked by attempting to provide better lenses, better film emulsion, multiple exposures, and other similar techniques and materials. Usually an image is produced by attempting to reconstruct the light patterns as they exist at the surface of the object. Thus, if one can substantially reproduce all the points on the surface of an object, either as light and dark points or as colored points, the image is considered good. Conventionally, a lens, a lens system, or an optical system is used to bend light rays emerging from a point (by reflection or other means) on an object to produce a corresponding point separated in space from the original. A collection of such points forms an image. In seeking to provide a well-constructed image, much time and money is required in prior art processes to correct optical system aberrations and to select materials that produce fewer defects in the process of light reflection and transmission.

One object of this invention is to produce images without the need of lenses.

Another object of this invention is to provide a system for storing information, such as by "stacking" a number of images on a single photographic plate.

Another object of this invention is to provide a type of microscope that can operate without lenses.

Another object of this invention is to provide color images with black and white photosensitive material.

Another object of this invention is to provide a method or apparatus for correcting aberrations of optical systems.

In this invention, a wavefront of light rays emerging from an object is captured by a detecting device (preferably a photographic plate or film) to form a pattern and the wavefronts are reconstructed from, and focused by, the detection device to produce an image that has the same characteristics as an image produced by the original object and an aberration-corrected optical system. Accordingly to the present invention, if one moves the eye around in the area where the reconstructed wavefronts are focused, one does not see merely those points that were on a direct line between the object and the detecting device, but one sees new points coming into view as others go out of view, so that one can look "behind" or around structures in the foreground to see structures in the background. The phenomenon gives one the impression that the image is created by a lens system and the original object is still present, as stated above.

Briefly described, this invention includes a method and apparatus for producing images without lenses comprising, illuminating an object with a source of coherent light, positioning a detecting device to receive light from the object, positioning means for directing a portion of the coherent light onto the detecting device to produce a pattern, and illuminating the pattern on the detector with coherent light to reconstruct a 3-dimensional virtual image and a 3-dimensional real image.

More specifically, the invention includes the method of and apparatus for constructing and reconstructing holograms of the off-axis type wherein coherent radiation is directed onto an object to provide an object-bearing beam in the path of which is positioned a detector sensitive to the coherent radiation. Radiation coherent with the first-named coherent radiation is directed as a reference beam onto the detector at a finite angle with respect to the object-bearing beam to produce therewith a pattern of interference fringes on the detector in the form of a hologram. The pattern is illuminated with coherent radiation as an illuminating beam, thereby producing an image of the object, and the image is detected along an axis angularly displaced from the illuminating beam.

A preferred source of coherent light is the light produced by a laser and the preferred detector is a photographic plate. If the coherent light is collimated, i.e., as though its source were at infinity, the size of the image produced is solely dependent on its distance from the object. If the coherent light is divergent, either for forming the pattern, reconstructing the image, or both, the image is enlarged.

The orientation of the portion of coherent light that is directed onto the detecting device determines the position of the images formed by the pattern resulting from the interference between the "object-bearing" beam and the directed beam. If one pattern (with one subject) is formed with the directed light oriented in one manner, and a second pattern is formed (with a second subject) with the directed light oriented in a second manner, two sets of virtual and real images are formed, focused at different locations, and the images can be viewed separately. This process of "stacking" patterns can be continued within the limits of the density produced by the stacked pattern.

Each point on the object produces a pattern that extends over the entire detecting means and any portion of that pattern will reproduce that point for reconstruction of the image. Thus, the detecting means can be broken or cut into pieces and from each piece an image of the same size as the original but of less intensity can be produced if the intensity of the illuminating source is the same for both forming and reproducing the pattern. However, if the illuminating light is concentrated to the size of one piece, the image reproduced from that piece retains its original intensity.

The radiation for producing the pattern need not be light. Any radiation that can be detected and captured by a detecting device will suffice. For example, photographic plates are sensitive to infrared, ultraviolet, X-rays, and gamma rays. The invention, therefore, operates with many "types" of radiation. With photographic plates as detectors, it is possible to produce images using radiations having wave lengths of from $10^{-11}$ centimeters to $10^{-1}$ centimeters, the visible spectrum comprising only those wave lengths in the range between $4 \times 10^{-5}$ centimeters (extreme violet) and $7.2 \times 10^{-5}$ centimeters (deep red). According to this invention, since no lenses are involved, radiation that cannot be refracted by ordinary lenses can be put to use to produce types of images heretofore impossible, for example, magnification of shadow images formed from X-rays produced from a coherent source.

One advantage of this invention is that a few changes in the system can be made to produce images appearing either much larger than the object, or smaller than the object, as desired, thus introducing magnification or miniaturization without lenses.

Another advantage of this invention is that images in color can be produced without the use of color-sensitive film or plates.

Another advantage of this invention is that the detecting device may be used to correct a lens or optical system, eliminating almost all of the monochromatic aberrations that exist in the lens or optical system.

Still another advantage of this invention is that it may employ detecting devices sensitive to all the same radiations as any photographic process, wherefore images may be produced with radiations outside the visible spectrum.

Still another advantage of this invention is that magnification does not depend upon an optical system. Even images formed by radiations that cannot be refracted by glass can be enlarged by the method and apparatus of this invention, since lenses are not involved.

Still another advantage of this invention is that a plurality of patterns can be recorded on a detecting device and, when the patterns are reconstructed, each pattern produces an image focused at a location that is completely separate and distinct from the location of the other images.

Still another advantage of this invention is that the detecting device may be divided into numerous pieces and each piece can be used to reconstruct the total image.

Still other objects and advantages of this invention will be apparent from the description that follows, the drawings, and the appended claims.

In order to provide a background for understanding the invention described herein, a brief discussion of certain principles in the field of physical optics is given. Amplification of these principles will be found in text books dealing with the subject. FIGS. 1–6 are related to the invention only in that they are used to illustrate certain details of this discussion intended to provide background information preliminary to the actual description of the invention.

Figure 1:
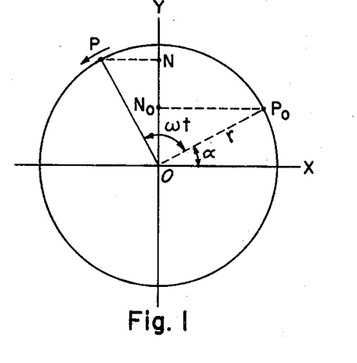
FIG. 1 is a diagram showing a reproduction of the motion of a particle influenced by a sine wave.

According to the theory of wave motion, the passage of a train of waves through a medium sets each particle of the medium into motion. Wave motions can be studied by determining the action of such particles as they are passed by the waves. For example, a particle of water, although participating in the formation and destruction of a passing wave, does not travel with the wave but, ideally, moves up and down in the crest and trough of the wave as it passes. A periodic motion is one which repeats itself exactly in successive intervals of time. At the end of each interval, the position and velocity of the particle is the same as the initial position and velocity, and the time between such occurrences is called a period. The simplest type of periodic motion along a straight line is one in which the displacement (designated as $y$) is given by the equation $$y = r \sin (\omega t + \alpha) \qquad (1)$$

where $r$ is called the amplitude of the motion, $\omega$ is the angular velocity in radians per second, $t$ is the time in seconds, and $\alpha$ is the phase constant. The entire angle $(\omega t + \alpha)$ determines the position of the particle (N) at any instant and is called the phase angle or simply the phase. The position of N at zero time $(t=0)$ is determined by the angle $\alpha$, which is the initial value of the phase. FIG. 1 shows a construction for determining the position of a particle N at any time. This comprises a circle of radius $r$ having its center at the origin of a coordinate system. The horizontal projection of point P moving on the circumference of such a circle at a constant angular velocity $\omega$, reproduces the displacement of a particle influenced by a sine wave. Point $P_o$, corresponding to the position of the particle at time $t=0$, is displaced from the axis by an angle $\alpha$, and the magnitude of the initial displacement is represented by the distance $N_o$ measured along the Y axis. After a period of time $t$ the position of the particle ($P_1$) will be determined by the angle $(\omega t + \alpha)$ and the displacement will be $N_1$ measured along the Y axis. As the point P moves around the circle and again arrives at $P_o$, it will have completed a "period" and its projection N will have described one complete cycle of displacement values.

Figure 2:
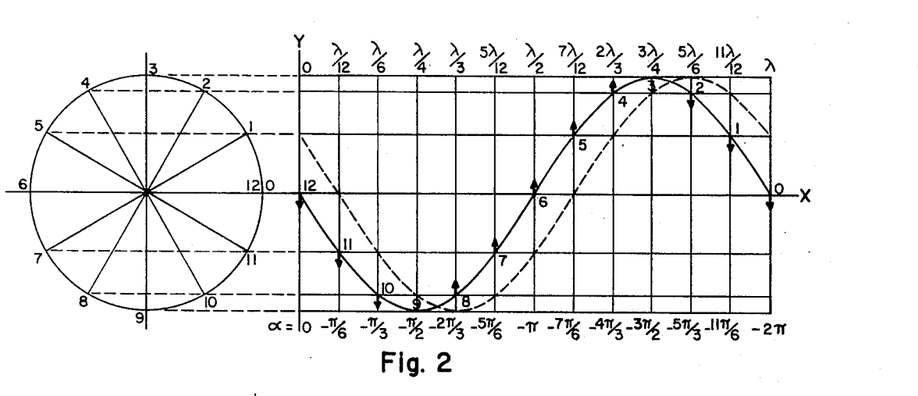
FIG. 2 is a diagram of two sine waves that are thirty degrees out of phase.

FIG. 2 shows graphically the displacement pattern of a particle through one cycle of a sine wave. A group of 12 points has been projected onto a curve, and by connecting such points a picture of the wave appears. The solid line shows a wave where the initial phase angle $\alpha$ was zero, and the broken line shows a wave where the initial phase angle was 30 degrees or $\pi/6$. The direction of motion of the particle at each position, on the solid line, is indicated by the arrows in FIG. 2. The phase difference in the two waves shown is important in that if the two waves were to be projected through the same medium and oriented along the same axis, at the same time, the result of the particle motion would be an addition of the two waves to form a compound wave. At those points where the waves tend to make the particle move in the same direction, the height or depth of the compound wave would be increased and, at those points where the waves tend to influence the particle to move in opposite directions, they tend to cancel each other out so that the resultant compound wave is moved toward the axis along which it travels. The entire length of the wave, or wave length, is designated $\lambda$. In FIG. 2, the waves are out of phase by the angle $\pi/6$, in distance $\frac{1}{12} \lambda$. If they were out of phase by half of a period $\pi$ (or $\frac{1}{2} \lambda$), the peaks and valleys would fall in opposite directions and they would tend to cancel each other out. If the waves were exactly in phase, i.e., on top of one another, the peaks and valleys would reinforce one another, so that the resultant compound wave would have twice the amplitude of either single wave.

Figure 3A:
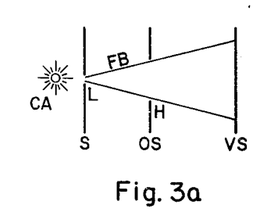
FIG. 3 is a diagram for demonstrating the diffraction of light.
Figure 3B:
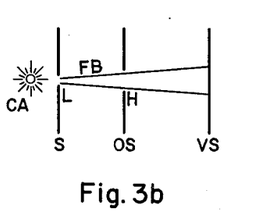
Figure 3C:
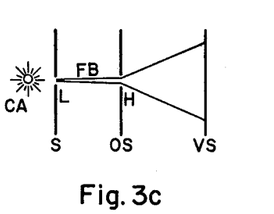

An interesting characteristic of light is exhibited if one attempts to isolate a single "ray" of light by the method shown in FIG. 3. In FIG. 3a, a light source of the smallest possible size is represented by L which might be obtained by focusing the light from the white-hot positive pole of a carbon arc (represented by CA) on a metal screen S pierced with a small hole. This is a convenient way of approximating a "point source" of light which produces a type of coherent light. Coherent light is necessary to this invention and is described later. If another opaque screen OS, provided with a much larger hole H, is positioned between L and a viewing screen VS, only that portion of the viewing screen VS lying between the straight lines FB drawn from L will be appreciably illuminated, as shown in FIG. 3a. If the hole H is made smaller, as in FIG. 3b, the illuminated area on the screen VS gets correspondingly smaller, so that it appears that one could isolate a single ray of light by making the hole H vanishingly small. Experimentation along this line reveals, however, that at a certain width of H (a few tenths of a millimeter) the bright spot begins to widen again (FIG. 3c). The result of making the hole H very small is to cause the illumination, although very weak, to spread out over a considerable area of the screen. When waves pass through an aperture, or pass the edge of an obstacle, they always spread to some extent into the region which is not directly exposed to the oncoming waves. The failure to isolate a single ray of light by the method described above is due to the process called "diffraction." In order to explain this bending of light, the rule has been proposed that each point on a wavefront may be regarded as a new source of waves.

Figure 4:
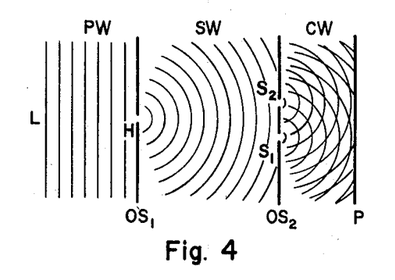
FIG. 4 is a diagram showing the interference of light from a coherent source passing through two slits.

If one were to drop two stones simultaneously in a quiet pool of water, one would notice two sets of waves crossing each other. In the region of crossing, there are places where the disturbance is practically zero and others where it is greater than that which would be given by either wave alone. This phenomenon, called the principle of superposition, can also be observed with light waves. FIG. 4 is a diagram illustrating such a phenomenon. The light source L, effectively located at infinity (this effect can be accomplished by using a lens that collimates the light), emits parallel waves of light PW. The parallel waves of light PW strike an opaque screen $OS_1$ having a hole H and the light that gets through the hole H diffracts to form spherical waves SW that pass to a second opaque screen $OS_2$. The second opaque screen $OS_2$ has two slits $S_1$ and $S_2$. The light passing through the two slits $S_1$ and $S_2$ is again diffracted, but in this case, since the two openings are slits $S_1$ and $S_2$, the light waves are diffracted in a cylindrical wavefront pattern as indicated by the designation CW. If the circular lines, designated CW, represent crests of waves, the intersection of any two lines represents the arrival at these two points of two waves with the same phase, or with phases differing by a multiple of $2\pi$ (or $\lambda$). Such points are therefore those of maximum disturbance or brightness. A close examination of the light on the screen P will reveal evenly spaced light and dark bands of fringes.

The two interfering groups of light waves CW are always derived from the same source of light L. If one were to attempt the above experiment using two separate lamp filaments set side by side, no interference fringes would appear. With ordinary lamp filaments, the light is not emitted in an infinite train of waves. Actually, there are sudden changes in phase that occur in a very short interval of time (in about $10^{-8}$ seconds). When two separate lamp filaments are used, interference fringes appear but exist for such a very short period of time that they cannot be recorded. Each time there is a phase change in the light emitted from one of the filaments, the light and dark areas of the fringe pattern change position. The light emitted from the two slits $S_1$ and $S_2$ in FIG. 4 (and other similar arrangements) always have point-to-point correspondence of phase, since they are both derived from the same source. If the phase of the light from a point in one slit suddenly shifts, that of the light from the corresponding point in the other slit will shift simultaneously. The result is that the difference in phase between any pair of points in the two slits always remain constant, and so the interference fringes are stationary. If one is to produce an interference pattern with light, the sources must have this point-to-point phase relation and sources that have this relation are called "coherent sources."

If the number of slits in the screen $OS_2$, is increased and the slits are equidistant and of the same width, the screen $OS_2$ becomes a diffraction grating. When this is done, the number of waves of the type CW increase and the number of interference points increase. The result is that the evenly spaced light and dark bands on the screen change their pattern somewhat as the number of slits is increased. The pattern is modified as the number of slits is increased by narrowing the interference maxima (so that the bright bands on the screen are decreased in width). If the screen P in FIG. 4 is a photographic plate, a series of narrow light bands is produced which may in turn serve as a diffraction grating itself. Two kinds of diffraction patterns are recognized and defined by the mathematics that treats them, i.e., Fresnel diffraction and Fraunhofer diffraction. The latter occurs when the screen on which the pattern is observed is at infinite distances; otherwise the diffraction is of the Fresnel type. The invention is mostly concerned with Fresnel diffraction.

Figure 5:
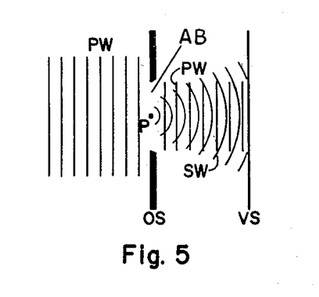
FIG. 5 is a diagram based on the theory of diffraction of light.
Figure 6:
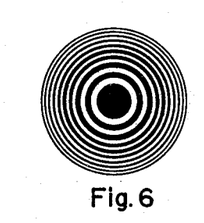
FIG. 6 is a diagram of a Fresnel zone plate.

Diffraction also occurs with an opening having an opaque point positioned in the opening. FIG. 5 shows the pattern of light waves produced when the light source is positioned at infinity and parallel waves PW arrives at an opening AB in an opaque screen OS. A point P is positioned in the opening AB and acts like a source producing a train of concentric spherical waves SW, centered at the opaque point P. These wavelets SW combine with the direct beam of waves PW to produce a series of concentric interference rings on the screen VS such as shown in FIG. 6 wherein each white area of the pattern is equal to each of the other white areas and each is covered by a black ring which is equal to each of the other black areas. This pattern is referred to as a zone plate. If the zone plate pattern is again exposed to coherent light, it will produce a point of light of great intensity on its axis at a distance corresponding to the size of the zones and the wavelength of light used, i.e., the light is focused by a pattern rather than a lens. The Fresnel zone plate appears to act as a type of lens. Furthermore, if a small object is positioned in the hole AB of the screen OS of FIG. 5, a Fresnel diffraction pattern is formed from the small object. It would appear that it would be possible to capture a multiple Fresnel diffraction pattern for each point on an object and pass the light through the captured multiple pattern to form an image. To a certain extent, this is true, but it is not quite so simple.

Two major difficulties are encountered if one attempts to produce an image by illuminating an object with coherent light using a point source as described above. First, the light from a point source is very weak. This difficulty is overcome by using the light emitted from a laser. Laser light has the property of point-to-point correspondence of phase, which simply means it produces the coherent light necessary for generating the Fresnel diffraction pattern. Assume that a laser beam is directed onto a photographic transparency and a photographic plate is positioned to capture the Fresnel diffraction patterns resulting therefrom. When coherent light is directed onto the developed plate, a crude image appears. This occurs only with relatively simple objects that transmit a large portion of the light through the object without scattering. The primary difficulty with the process (and accordingly with many 3-dimensional imaging processes) is that the phase of the incident beam (the beam directed onto the transparency) is lost. This, in general, makes the reconstruction of an image impossible. If a portion of the light passing through the transparency is not scattered, some of the phase is retained, so that reconstruction of very simple objects, such as black lettering on a white background, is possible. When the object illuminated is more complicated, the loss of phase exacts its toll and light "noise" is generated so as to completely obscure the image if one attempts to reconstruct it.

Figure 7:
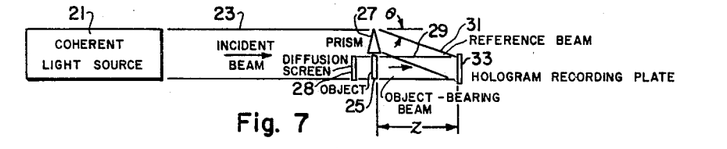
FIG. 7 is a diagram illustrating a method for producing a hologram.

A 2-beam interferometric process may be used to produce a pattern of interference fringes on a detecting device (such as a photographic plate), and this is called a hologram. FIG. 7 shows this process in operation. A coherent light source, such as a laser 21, produces an incident beam 23 which illuminates a transparency or object 25 and a prism 27. In order to produce images of improved quality, a diffusion screen 28 (such as ground glass) is placed between the light source 21 and the object 25. The light passing through the transparency produces a beam of scattered light 29 that carries the Fresnel diffraction pattern of each point on the object 25, some of which is captured by a detector such as a photographic plate 33 positioned at a distance $z$ from the object 25. The phase relationship in the beam 29 is almost completely destroyed. The prism 27 bends the other portion of the incident beam 23 through an angle $\theta$ directing a beam of light 31 onto the plate 33. As will be seen in FIG. 7, the reference beam 31 is directed onto the detector 33 at a finite angle $\theta$ with respect to the object-bearing beam 29. This light in beam 31 has retained its phase relationship and produces a pattern of interference fringes when combined with the Fresnel fringes being transmitted in beam 29. The result is a combination pattern of multiple Fresnel fringes and interference fringes, called a hologram. The incident beam 23, deflected through an angle $\theta$, to form the reference beam 31, is preferably about two to ten times stronger in intensity than beam 29.

Figure 8:
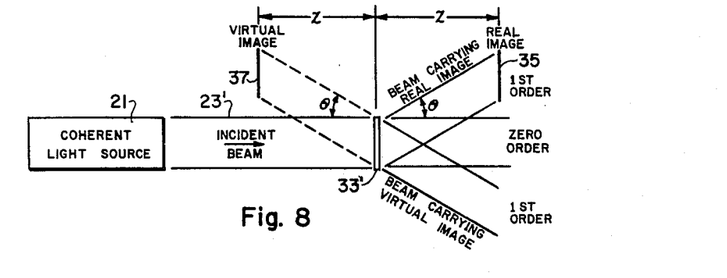
FIG. 8 is a diagram illustrating a method for reconstruction.

After the photographic plate is developed, reconstruction is accomplished according to the diagram of FIG. 8. The hologram 33' is illuminated by an incident beam 23' of coherent light and a real image 35 forms at a distance $z$ on one side of the hologram 33', and a virtual image 37 forms at a distance $z$ on the other side of the hologram 33'. The fine line structure of the hologram 33' causes the hologram 33' to act like a diffraction grating, producing a first-order pair of diffracted waves, as shown in FIG. 8. One of these produces the real image 35, occurring in the same plane as a conventional real image, but displaced to an off-axis position with respect to the illuminating beam 23' through the angle $\theta$. The angle $\theta$ and distance $z$ will be the same in the reconstruction process as they were in the hologram-forming process if the same wavelength of light is used in both instances. The images 35 and 37 are of high quality and either the real image 35 or virtual image 37 can be photographed. The real image 35 is more convenient to use since the real image 35 can be recorded by placing a plate at the image position, determined by the distance $z$ and the angle $\theta$, thus avoiding the need for a lens. Hence, the entire process may be carried out without lenses.

The density pattern produced on the plate 33 is such that if one wanted to produce the plate 33 artificially, for example, by hand-drawing the appropriate pattern and photographing it onto a plate, one would do so in the following manner: each point on the object interferes with the reference beam to produce a fringe pattern in which the fringes are circular and concentric, with the outer fringes being more closely packed than the inner ones. The fringe pattern is like a section taken from the Fresnel zone plate (FIG. 6) except that the fringes are shaded, going gradually from transparent to black and then to transparent, whereas the fringes of the usual Fresnel zone plates go from transparent to black in a single, abrupt step. If an object is thought of as a summation of many points, then each point produces a pattern like the one described, but such pattern is displaced from those produced by other points in the same manner that the points themselves are displaced from each other. The hologram is thus the summation of many such zone-plate sections, and one could produce an artificial hologram by drawing a superimposed zone plate pattern. Of course, the process would be very difficult and could only be done for the most simple objects.

In the absence of the reference beam 31, the photographic plate 33 produces a conventional diffraction pattern. Let the light reflected by the object be a function S of X and $y$, i.e., $S(x,y)$ and the photographic plate receive the light in accordance with the function $S_o$ of X and $y$ or $S_o(x,y)$. The function $S_o(x,y)$ is a complex quantity having both amplitude and phase, the polar form of which is $$S_o(x,y) = a(x,y)e^{j\phi(x,y)} \qquad (2)$$

where $a$ is the amplitude modulus and $\phi$ is the phase of the impinging light. A photographic plate records only the amplitude factor $a$; the phase portion $e^{j\phi}$ is discarded. The conventional fringe pattern is thus an incomplete record.

The interference pattern produced when the second beam, which is called the reference beam 31, is present, is called a hologram 33'. It is characterized by the fact that the phase portion $\phi$ of the Fresnel diffraction pattern is also recorded. If the reference beam 31 has an amplitude modulus $a_o$, it will produce at the photographic plate 33, a wave of amplitude $a_o e^{j\alpha x}$, where the phase term $e^{j\alpha x}$ results from the beam impinging on the plate 33 at an angle. A beam impinging on a plane at an angle $\theta$ produces (for small values of $\theta$) a progressive phase retardation factor indicated by the exponent $(j2\pi x \theta/\lambda)$ across this plane. Hence we have the relation $\alpha = 2\pi\theta/\lambda$.

When the reference beam is present, the light amplitude distribution at the hologram recording plane is $a_o e^{j\alpha x} + ae^{j\phi}$. Let us assume that the plate which records this distribution has a response which is linear with intensity, that is, suppose the amplitude transmittance of the plate after development to be given by $$T = T_o - kI \qquad (3)$$

where $I$ is the intensity distribution at the photographic plate 33, $$I = |a_o e^{j\alpha x} + ae^{j\phi}|^2 \qquad (4)$$

and $T_o$ and $k$ are constants determined by the transmittance exposure characteristic of the plate. Equation 3 is, in general, a reasonable approximation to the actual characteristic over a transmittance between about 0.2 and 0.8, measured relative to the base transmittance. The resultant transmittance of the recording plate is, therefore, $$T = T_0 - k|a_0 e^{j\alpha x} + a e^{j\phi}|^2$$

$$= T_0 - k a_0^2 - k a^2 - 2 k a_0 a \cos(\alpha x - \phi) \quad (5)$$

The plate thus behaves like a square-law modulating device producing a term $2 k a_0 a \cos(\alpha x - \phi)$ which is the real part of the original Fresnel diffraction pattern, modulated onto a carrier $\alpha$. In the absence of a diffracting object, this term represents a uniform fringe pattern produced by the interference between the two beams. When a diffracting object is present, its Fresnel diffraction pattern modulates this fringe pattern. The amplitude modulus of the diffraction pattern produces an amplitude modulation of the fringes, and the phase portion $\phi$ produces a phase modulation (or spacing modulation) of the fringes.

The present process permits the photographic plate to record both the amplitude modulus and the phase of the Fresnel diffraction pattern. The complete demonstration of this requires that the final term of Equation 5 be separable from the remaining terms. The actual method for the reconstruction process has been discussed with reference to FIG. 8.

When the hologram 33' is placed in the collimated beam of monochromatic light, as shown in FIG. 8, the bias term $T_0 - k a_0^2$ and the term $k a^2$ combine to form a reconstruction that is essentially the reconstruction produced by the pattern formed where the carrier beam 31 is not used. From this term, a real image forms at a distance $z$ on one side of the hologram 33', and a virtual image forms at an equal distance on the other side of the hologram 33' (these are the low-quality conventional images). As was previously mentioned, the fine-line structure of the hologram which causes the hologram to act like a diffraction grating producing the pair of first-order diffracted waves is embodied in the term $k a_0 a \cos (\alpha x - \phi)$. As seen from FIG. 8, the light components comprising the two off-axis images are nonoverlapping and both components are removed from the region where the conventional reconstruction occurs (these two images are the high quality images that we seek). A comprehensive mathematical analysis supporting these contentions can be given. However, for the present purpose, if the term $k a_0 a \cos (\alpha x - \phi)$ of Equation 5 is rewritten in its exponential form, $$\tfrac{1}{2} k a_0 a e^{j(\alpha x - \phi)} + \tfrac{1}{2} k a_0 a e^{-j(\alpha x - \phi)}$$

it is seen that the first exponential term is, to within a constant multiplier and an exponential term $e^{j\alpha x}$, exactly the complex function that describes the Fresnel diffraction pattern produced at the plate 33 by the object 25. This term can therefore be considered as having been produced by a virtual image at a distance $z$ from the hologram 33'. The factor $e^{j\alpha x}$ alters this view only in that it results in the virtual image being displaced laterally a distance proportional to $\alpha$. The conjugate term $$\tfrac{1}{2} a_0 a e^{-j(\alpha x - \phi)}$$

produces the real image, which likewise is displaced from the axis, as implied by the factor $e^{-j(\alpha x - \phi)}$.

The results of the method just described are based on the square-law characteristic of the recording plate, as given by Equation 3 and a proper term for the recording plate is a "square-law detector." If this relation is only approximately obtained, there will be higher-order distortion terms present on the hologram. These will, for the most part, give rise to second and higher-order diffracted waves, which, in the reconstruction process, will form additional images at greater off-axis positions, and will therefore be separated from the first-order images. Hence, while it is assumed a specific and approximately realized film characteristic, the actual characteristic is not at all critical to the process, and in no way is it necessary or apparently even desirable to consider controlling this characteristic.

By controlling the relative amplitude of the object-bearing beam 29, for example, by the use of attenuating filters placed in one of the beams, the contrast of the fringe pattern can be controlled. If this contrast were made sufficiently small by attenuating the object-bearing beam, then Equation 3 would certainly be made to hold to great accuracy if this were desired. However, if the fringe contrast is too low, the reconstructed image will tend to be grainy. Good reconstructions are, in practice, possible over a wide range of fringe contrasts.

One feature of interest is that the reconstructed image is positive, that is, it has the same polarity as the original object. If the hologram is contact-printed so as to produce a negative of the original hologram, then this negative hologram also produces a positive reconstruction.

Figure 9:
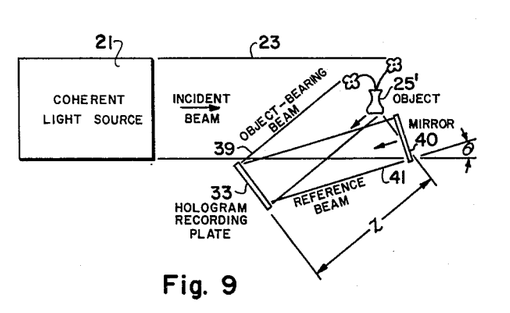
FIG. 9 is a diagram illustrating a method for photographing a solid object without lenses.

FIG. 9 shows a method for producing a hologram using an opaque object 25'. The illuminating light, i.e., the incident beam 23, is coherent light from a source such as a laser 21. A diffusion screen (such as the diffusion screen 28 of FIG. 7) may be placed between the light source 21 and the object 25'. The object 25', which may be any complex pattern, reflects light to a photographic plate 33, as shown by the object-bearing beam 39. A portion of the incident beam 23 is reflected to the photographic plate 33 by a mirror 40, as shown by the reference beam 41. The photographic plate is placed any distance $z$ from the object 25' and the incident beam is reflected through the angle $\theta$. The interference of the two beams 39 and 41 produces a hologram on the photographic plate 33. After the plate 33 is developed, the semitransparent plate 33' is placed in the beam 23' of coherent light, as shown in FIG. 8, and the virtual and real images 37 and 35 appear as 3-dimensional images. Both images are a reconstruction of the original object. In the reconstruction, the images are positioned at a distance $z$ and at an angle $\theta$ as shown in FIG. 8.

Figure 10:
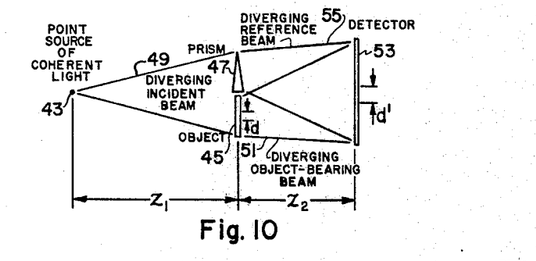
FIG. 10 is a diagram illustrating the first step for magnifying the image size.

The invention can also be embodied in a lensless microscope by a 2-step imaging process. The magnifications are as great as any optical microscope and the lensless microscope operates with little or no aberrations over a large field. Referring to FIG. 10, a point source 43 of diverging coherent light illuminates an object 45 and a prism 47 with a diverging incident beam 49. A diverging object-bearing beam 51 is transmitted to a photographic plate 53 and a diverging reference beam 55 is directed by prism 47 onto the photographic plate 53. The object 45 is placed at a distance $z_1$ from the point source 43 and the photographic plate 53 is placed a distance $z_2$ from the object. It will be understood that FIG. 10 is diagrammatic and that any suitable support means may be used to hold the object 45 and the detector 53 in the respective positions specified above.

Figure 11:
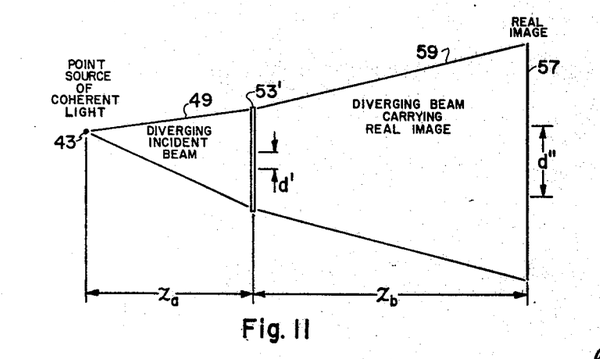
FIG. 11 is a diagram illustrating the second step for magnifying the image size.

FIG. 11 is a diagram showing the developed hologram 53' positioned in the divering incident beam 49 originating from the point source 43 at a distance $z_a$ from the hologram 53'. A real image 57 is produced by a diverging beam 59 and may be discerned or detected, i.e., observed or recorded, in a plane at a distance $z_b$ from the hologram. It will be noted from FIG. 11 that the beam 59 carrying the real image is at an angle displaced from the axis of the diverging incident beam 49 which illuminates the developed hologram 53'. It will be obvious to those skilled in the art that any suitable support means may be used to hold the developed hologram 53' in the position specified above. It will also be obvious to those skilled in the art that when the real image 57 is to be recorded in a plane at a distance $z_b$ from the hologram, a photographic plate will be positioned in the plane of the real image 57.

To calculate the magnification of the process, note first the magnification produced in the first step of the process shown by the diagram of FIG. 10. Consider two point scatterers on the object 45, separated by a distance $d$. The Fresnel diffraction patterns of these points are similar but separated on the plate 53 by a distance, $$d' = d\frac{z_2+z_1}{z_1}$$

The magnification $M_1$ of the first step is therefore $$M_1 = \frac{d'}{d} = \frac{z_2+z_1}{z_1} \qquad (6)$$

The magnification $M_2$ produced by the reconstruction process is less obvious. Referring now to FIG. 11, let the hologram 53' be placed a distance $z_a$ from the source 43, and suppose a real image 57 is formed a distance $z_b$ from the hologram. Again, consider the object 45 to have had two points separated by $d$. Their Fresnel diffraction patterns are separated a distance $d'$ on the hologram 53. These diffraction patterns act like the zone plate of FIG. 6, bringing the incident light from the beam 49 to a focus. Each zone plate produces a point focus, whose separation is shown as $d''$ (FIG. 11) and is determined by $$d'' = d'\frac{z_a+z_b}{z_a}$$

The magnification $M_2$ of the second step is given by $$M_2 = \frac{d''}{d'} = \frac{z_a+z_b}{z_a} = 1 + \frac{z_b}{z_a} \qquad (7)$$

To find the over-all magnification, it is necessary to know $z_b$. Consider the distribution of the light on the object to be a function $s$ of $x$ and $y$, i.e., $s(x,y)$. The light passing a distance $z_2$ from the object to the plate and carrying the Fresnel diffraction pattern is represented by $S_o(x,y)$ and $$S_o(x,y) = s(x,y) * \frac{i}{\pi\lambda} e^{j\frac{\pi}{\lambda z_2}(x^2+y^2)}$$

The preceding paragraph relates to magnification. Reference is now made to the case of a plane wave reference beam used in the construction process. The second beam introduces a wave $e^{j\alpha x}$, and the two beams are summed and square-law detected, producing $$|e^{j\alpha x}+S_o|^2 = 1 + S_o^2 + 2Re(S_o e^{j\alpha x})$$

In the reconstruction process, the final term produces $$S_o e^{j\alpha x} + (S_o e^{j\alpha x})\dagger$$

The first term is a replica of the original wavefront which the plate recorded and, therefore, represents diverging wavelets and produces a virtual image. The second term represents converging wavelets and produces a real image, which, of course, can be photographed without the need for any lenses.

To continue with the calculation of the magnification, the light scattered from a point on the object produces at the hologram the exponent $$\exp\left[-j\frac{\pi}{\lambda z_2}(x^2+y^2)\right]$$

while for the reference beam, we have $$\exp\left\{-j\left[\frac{\pi}{\lambda(z_1+z_2)}(x^2+y^2)+\alpha x\right]\right\}$$

The recorded zone plate is of the form $$\cos\left[\frac{\pi}{\lambda}(x^2+y^2)\left(\frac{1}{z_2}-\frac{1}{z_1+z_2}\right)+\alpha x\right]$$

The recorded hologram thus has a focal length $$f_h = \pm\frac{1}{\frac{1}{z_2}-\frac{1}{z_1+z_2}}$$

\* Indicating that the term is a complex conjugate.
† Indicating convolution.

By using the positive sign for the above expression, we find that the focal length may be expressed as follows:

$$f_h = \frac{z_2(z_1+z_2)}{z_1}$$

The distance $z_b$ is then found by applying the lens formula (where the reciprocal of the object distance plus the reciprocal of the image distance equals the focal length of the lens) to give the zone plate $$\frac{1}{z_b}+\frac{1}{z_a}=\frac{1}{f_h}=\frac{z_1}{z_2(z_1+z_2)}$$

$$\frac{1}{z_2} = \frac{z_1 z_a - z_2^2 - z_2 z_2}{z_a z_b(z_1+z_2)} \qquad (8)$$

The total magnification is therefore $$M = M_1 M_2$$

and from Equations 6 and 7 and substituting the value of $z_b$ of Equation 8 into Equation 7, we have $$M = \frac{z_1+z_2}{z_1}\left(1+\frac{z_2(z_1+z_2)}{z_1 z_a - z_2^2 - z_2 z_1}\right)$$

$$= \frac{z_a(z_1+z_2)}{z_1 z_a - z_2(z_1+z_2)} \qquad (9)$$

To make subsequent analysis easier, suppose during the reconstruction step we make $z_1$ equal $z_a$, i.e., the developed hologram photographic plate 53' is put back in the same position in FIG. 11 as the object 45 in FIG. 10 had when the hologram was made. This gives, $$M = \frac{1+p}{1-p-p^2} \qquad (10)$$

where $p$ equals $z_2/z_1$, and $$\frac{1}{z_b} = \frac{1-p-p^2}{p(z_1+z_2)}$$

Another useful expression is $$\frac{1}{z_b} = \frac{1}{z_2}\left(\frac{1-p-p^2}{1+p}\right) = \frac{1}{Mz_2}$$

so that $$z_b = M z_2 \qquad (11)$$

Now $z_b$ must be positive if a real image is to be produced, and $z_1$ and $z_2$ are both positive. Therefore, it is required that $$1-p-p^2 > 0$$

which requires that $$0 < p < \tfrac{1}{2}(\sqrt{5}-1) \approx .62$$

The lower bound of zero occurs because $p$ is always positive. As an example, if $p$ equals .6166 (where $z_2$ equals 30.85 mm. and $z_1$ equals 50 mm.) from Equation 10

$$M = \frac{1+.6166}{1-.6166-(.6166)^2} = 504 \text{ times}$$

and from Equation 11

$$z_b = 15.55 \text{ meters}$$

Figure 12A:
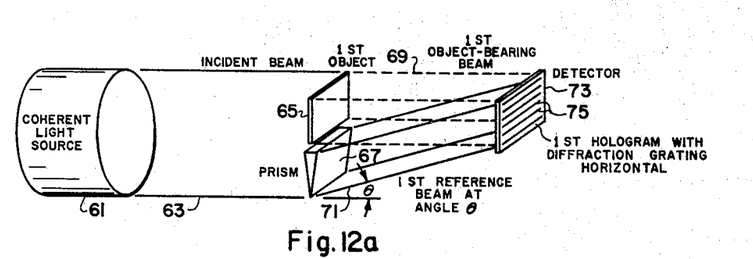
FIG. 12a and 12b are diagrams illustrating a method for recording images of different objects on one detector.
Figure 12B:
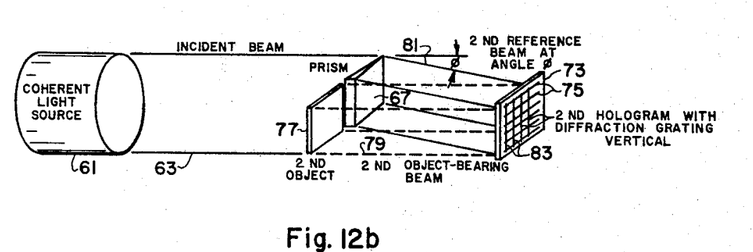
Figure 13:
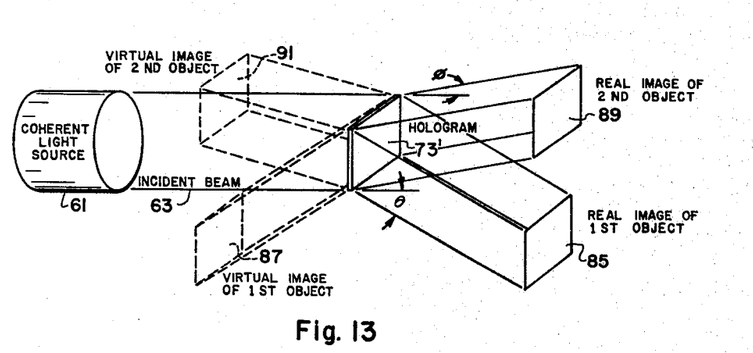
FIG. 13 is a diagram illustrating the reconstruction of images of a number of objects "stacked" on a complex hologram.

As previously noted, it is also possible by this invention to put a number of images from different objects on a single photographic plate. FIG. 12a is a diagram showing a coherent source of light 61 and its incident beam 63 illuminating a first object 65 and a prism 67. The prism 67 is placed below the first object 65 to deflect the beam from the coherent light source through an angle $\theta$. The object-bearing beam 69 (shown by the dotted line) and reference beam 71, are passed to the photographic plate 73 and form a pattern of interference fringes or a diffraction grating oriented horizontally and indicated by the lines 75—75 (although such lines would not be apparent on the developed film). As shown in FIG. 12b, after the first exposure is completed, a second object 77 is placed in the incident beam 63 with both the second object 77 and the photographic plate 73 in the same position as the first object 65 and photographic plate 73 were positioned for the first exposure. The prism 67 is now placed to one side of the second object 77 so that the incident beam is deflected through an angle $\phi$. A second object-bearing beam 79 and a second reference beam 81 are passed to the photographic plate 73 and form a second pattern of interference fringes or a second diffraction grating oriented vertically and indicated by the lines 83—83 on the photographic plate 73. After the photographic plate 73 is developed to bring out the complex hologram 75–83, the developed plate or hologram 73' is again positioned in the incident beam 63 of coherent light, as shown in FIG. 13. A real image 85 of the first object will appear at an off-axis angle $\theta$ below the hologram 75–83 on the side opposite the incident beam 63. The virtual image 87 of the first object will be positioned at an off-axis angle $\theta$ below the hologram 75–83 in a plane between the light source 61 and the hologram 75–83 (assuming that the light source is a sufficient distance from the hologram). The virtual image 87 can be viewed by positioning the eyes at an off-axis angle $\theta$ above the hologram 75–83 on the side opposite the incident (e.g., laser) beam 63 (this position and the position for viewing the virtual image 91 of the second object 77 is not shown so that the diagram of FIG. 13 remains uncluttered). The real image 89 of the second object appears at an off-axis angle $\phi$ on the same side of the hologram 75–83 as the prism 67 was placed with reference to the object 77 to produce the hologram 83. The real image 89 and real image 85 are both positioned in a plane perpendicular to the axis of the reference beam. A virtual image 91 of the second object is positioned at an angle $\phi$ with the incident beam and on the same side of the hologram 75–83 as virtual image 87, i.e., between the hologram 75–83 and the coherent light source 61. The virtual image 91 can be viewed by positioning the eyes at an off-axis angle $\phi$ on the opposite side of the hologram 75–83 that is illuminated by the incident light. When the real image 89 appears at an angle $\phi$ on the right side of the hologram 75–83 the virtual image 91 is viewed at an angle $\phi$ on the left side of the hologram 75–83. Additional "stacking" of holograms to form an even more complex hologram is accomplished by simply continuing to expose the plate 73 to one object after another while reorienting the prism 67 at different angles or positions or both for each object.

Figure 14:
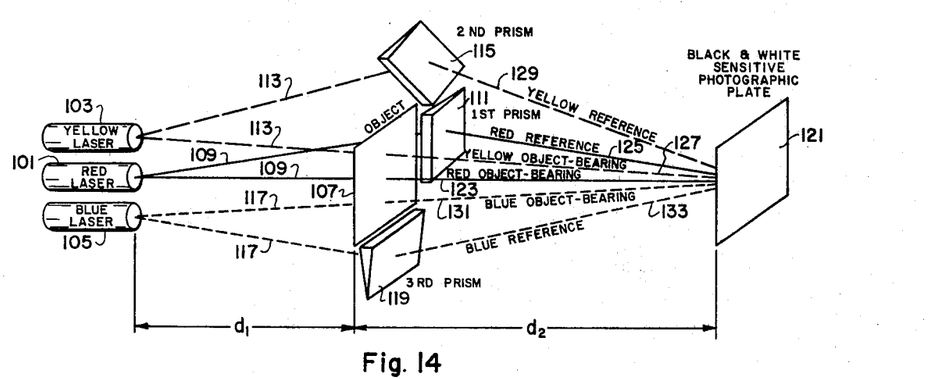
FIG. 14 is a diagram showing a method for producing color images from black and white photosensitive material.

An extension of the above method may be applied to produce images in color. The preceding description has related only to monochromatic light. FIG. 14 shows a method of producing color images with black and white photosensitive material, such as simple black and white film. A plurality of different colored coherent light sources, for example, a red laser 101 (meaning a laser that produces radiations in the red area of the visible spectrum), a yellow laser 103, and a blue laser 105, are all positioned to illuminate an object 107. The red light 109 (shown by the unbroken line) passes to the object 107 and a first prism 111 positioned, in this example, at the side of the object 107. Only the red light 109 is permitted to pass through the first prism 111. The yellow light 113 (shown by the dashed lines) illuminates the object 107 and a second prism 115 positioned, in this example, at a 45-degree angle to the horizontal axis of the object. The blue light 117 (shown by the dotted line) illuminates the object 107 and a third prism 119 placed below the object. Only the yellow light 113 illuminates the second prism 115 and only the blue light illuminates the third prism 119. The object 107 and prisms 111, 115, and 119 are positioned in a plane at a distance $d_1$ from the light sources 101, 103, and 105. A combination of six light patterns is transmitted to the black and white sensitive photographic plate 121 positioned at a distance $d_2$ from the object 107. The six light beams are: (1) a red object-bearing beam 123, (2) a red reference beam 125, (3) a yellow object-bearing beam 127, (4) a yellow reference beam 129, (5) a blue object-bearing beam 131, and (6) a blue reference beam 133. Each pair of beams, red (123, 125), yellow (127, 129), and blue (131, 133), produces a pattern of interference fringes each oriented in a separate way on the photographic plate 121. For purposes of description, they will be referred to as the red, yellow, and blue holograms, respectively (although actually the holograms are black and white and are the holograms formed by the red, yellow, and blue light, respectively). The plate 121 is eventually removed, developed, and then repositioned in the same location in FIG. 14, at the distance $d_2$ from the object 107 position. The prisms 111, 115, and 119 remain at their same angular orientation and distance orientation ($d_1$) to the laser light sources 101, 103, and 105. (Of course, if one wishes, the position arrangement of each part can be recorded or redetermined for the reconstruction step.) The only difference in the light arrangements between the hologram forming step and the reconstruction step is that an opaque screen is placed in the position formerly occupied by the object so that the only incident light passing to the complex hologram is from the prisms 111, 115, and 119 (formerly the reference beams). The result is an on-axis, 3-dimensional image in color (assuming that the object is 3-dimensional). The virtual colored image is located on an axis between the hologram and the opaque screen and is viewed on the side of the plate opposite the illuminating source. A real color image is focused in the on-axis position on the side of the plate opposite the virtual image.

The above method also operates successfully with an opaque object and mirrors instead of prisms. The image will be in color as long as one directs the incident beams for reconstruction into the complex hologram at the same angle that the reference (reflected) beams had for forming the hologram.

Figure 15:
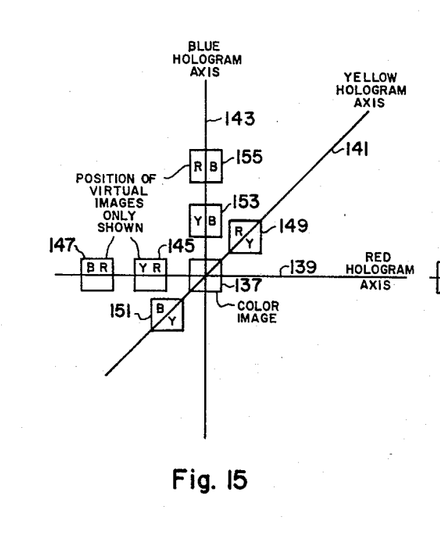
FIG. 15 is a diagram showing the reconstruction of the color image.

An interesting feature of the method described for producing color images is that when viewing the virtual color image, other virtual images may appear in off-axis positions, as shown in FIG. 15. As one views the color image 137, six additional virtual images are lying on three different axes: a red hologram axis 139, a yellow hologram axis 141, and a blue hologram axis 143. (This is purely an arbitrary assignment of terms, indicating merely that the images lying on each axis are derived from the red, yellow, and blue holograms, respectively.) On the red hologram axis 139, there is a yellow image 145 and a blue image 147 resulting from the yellow light and blue light, respectively, striking the diffraction grating of the red hologram. On the yellow hologram axis 141, there is a red image 149 and a blue image 151, resulting from the red light and blue light, respectively, striking the yellow hologram. On the blue hologram axis 143, there is a yellow image 153 and a red image 155, resulting from the yellow light and red light, respectively, striking the blue hologram.

Figure 16:
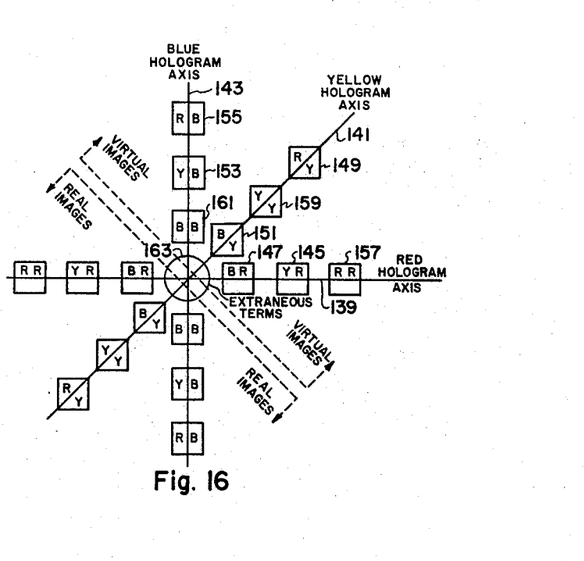
FIG. 16 is a diagram showing the various images produced from the method illustrated in FIG. 14.

The explanation of the six "extra" images 145, 147, 149, 151, 153, and 155 is shown in FIG. 16. If light is passed directly from all three lasers 101, 103, and 105 (without the prisms) and the complex hologram is viewed from the side opposite the three laser beams, there will be 18 images in all, nine virtual images and nine real images. The reference numerals applied to the elements in FIG. 15 are carried over and applied to the same elements in their changed positions in FIG. 16, for purposes of comparison. The color image 137 has apparently been destroyed, but can be reconstructed again. When a complex hologram is produced by the color method of FIG. 14, each hologram that was formed by one color produces a real and a virtual image for each color used in the reconstruction. Each image of FIG. 16 has been given two letter designations. The real images will be focused in front of the hologram (referring to the front as the side opposite the illuminating light and the back, or behind the hologram, as the illuminated side) and the virtual images behind the hologram. However, the virtual images are viewed by placing the eyes in the position (upper right) shown in FIG. 16 at a distance $d_2$ in front of the complex hologram, while a print from a real image is made in the position of the real images located in the (lower left) positions and at a distance $d_2$ in front of the hologram, as shown in FIG. 16.

Note in FIG. 16 that if the point of a compass was placed at the intersection of the three axes 139, 141, and 143, a circle could be drawn with its circumference intersecting all the images that have B for the first letter. The same is true for all the images that have Y for the first letter and is also true for all of the images having R for the first letter. The first letter of each image designates its color (and the color of the incident beam reconstructing it) and the second letter designates the hologram (the hologram formed by the red, yellow, or blue light in FIG. 14) the image is derived from. The virtual images of FIG. 16 are positioned differently than they are in FIG. 15 because FIG. 15 shows the image positions as they appear when the complex hologram is reconstructed with the light from each laser 101, 103, and 105 passing through the prisms 111, 115, and 119, respectively, with the prisms 111, 115, and 119 in their original positions of FIG. 14. FIG. 16 is a pattern of the virtual images (in the upper right portion of the diagram) when the light from the three lasers 101, 103, and 105 illuminates the complex hologram directly. When the red incident light reaches the complex hologram, it produces three virtual images: one from the red hologram, which is a red image 157 and is labeled RR in FIG. 16 (in this image 157, everything that was red in the object 107 will appear properly red); another image is formed by the red incident light and the yellow hologram, which is also a red image 149 and is labeled RY in FIG. 16 (everything that was yellow in the object 107 will appear red in the image 149); and a third image 155 is formed by the red light and blue hologram and is labeled RB in FIG. 16 (everything that appeared blue in the object 107 will appear red in the image 155). There are also three images 145, 153, and 159 formed when the yellow incident light illuminates the complex hologram. Image 159 is from the yellow incident light and yellow hologram and is labeled YY in FIG. 16. The other two images 145 (YR) and 153 (YB) are from the yellow incident light illuminating the red and blue holograms, respectively. In image 145, the reds of the object 107 will appear yellow, and the blues of the object 107 will appear yellow in image 153. Finally, the blue incident light produces images 147, 151, and 161 when the blue incident light illuminates the complex hologram. The image 161 (BB) is from the blue incident light and the blue hologram (everything in the object 107 that was blue is blue in image 161). In image 147, the reds, and in image 151, the yellows of the object 107 appear blue. The red-appearing images 149, 157, and 155 are positioned further from the intersection of the three axes 139, 141, and 143, because the red light wavelength is longer and is diffracted more by the diffraction grating of each hologram making up the complex hologram. The blue light wavelength is shorter and the blue images 147, 151, and 161 appear closest to the intersection of the axes 139, 141, and 143. The circle 163 in the center of the diagram of FIG. 16 represents the extraneous terms formerly mentioned in the discussion of FIG. 8.

When the prisms 111, 115, and 119 are placed in the original position of FIG. 14 for the reconstruction, the images from each hologram are displaced along their respective axes to give the position shown in FIG. 15, where the RR image 157, the YY image 159, and the BB image 161 are superimposed to form the color image 137. An interesting feature of illuminating the complex hologram through the prisms is (1) that the color image 137 appears and (2) the colors in the color image can be selected by moving the prisms that change the angle of the incident beam of a particular color that is illuminating the complex hologram and thereby move one image out of position in the superimposed image 137 and another image into the superimposed image 137. For example, suppose the angle of the yellow incident beam is changed so as to move the YY image 159 out and the YB image 153 into the superimposed image 137. The color of the image 137 would be changed to the effect that the yellow parts would lose their yellow tones and the yellow would be superimposed on the blues, changing them to green. Another method of changing the color of the color image 137 is by adding other prisms to the incident-beam system and simply bringing another image into the superimposed image 137. For example, a second incident beam of yellow light could be added through a prism adjusted in such a manner as to simply bring the YB image 153 into superposition with the images 157, 159, and 161. The image 137 now being comprised of images 153, 157, 159, and 161, would have yellow again superimposed on the blue, with the over-all yellows still retained. As a result of this "image changing," one can "paint" the image 137 almost any color desired and also change the color of the real image by superimposing selected real images in the same manner.

A wide beam of light striking a conventional lens parallel to its axis does not focus at a unique point. Fuzzy and distorted images from conventional optical systems are the result of some type of aberration. Both chromatic and monochromatic aberrations contribute to problems in optical systems, and of the two, monochromatic aberrations usually give the lens maker the most costly problems. In the theory concerning monochromatic aberrations, the deviation of any light ray from its prescribed path is expressed in terms of five sums, $S_1$ to $S_5$, called Seidel sums. If a lens were to be free of all aberrations, all five of these would have to be simultaneously and individually equal to zero. With geometrical optics, no optical system can be made to satisfy all these conditions at one time. The sums are therefore treated separately. The aberrations known as the five monochromatic aberrations are named spherical aberration, coma, astigmatism, curvature of field, and distortion. The conventional method of eliminating such aberrations is usually accomplished by constructing a lens from a multiplicity of simple elements, producing doublet, triplet lenses, etc. or by, for example, Schmidt corrector plates.

The method of this invention allows the lens or optical system to "correct itself" by making a hologram of the system, including its aberrations, and then using the hologram, referred to as a "phase plate," as a diffraction grating to produce a highly aberration-corrected optical system. This, of course, is accomplished for merely the cost of the photographic plate and the time required to make the hologram.

Figure 17:
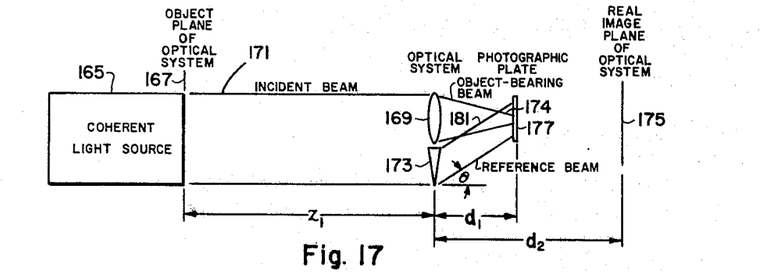
FIG. 17 is a diagram showing the production of a phase plate for correcting aberrations of optical systems.

FIG. 17 is a diagram illustrating the method of producing a phase plate. A coherent light source 165 is placed in the object plane 167 at a distance $z_1$ from the lens or optical system 169. The incident beam 171 illuminates the optical system 169 and a prism 173. The distance $z_1$ determines the plane in which a real image forms with a particular optical system so that the real image plane 175 is located at a distance $d_2$ from the optical system 169. The distance $z_1$ establishes the distance $d_2$. $z_1$ may, in some optical systems, be variable by only a few millimeters, as in the case of a microscope, or many miles as in the case of a telescope. After $d_2$ is determined, a photographic plate 177 is positioned between the optical system 169 and the real image plane 175 at a distance $d_1$ from the optical system 169 and $d_1$ is less than $d_2$. The object-bearing beam 174 from the optical system 169 and the reference beam 181 deflected at an angle $\theta$ by the prism 173, form a pattern of interference fringes on the photographic plate 177.

Figure 18:
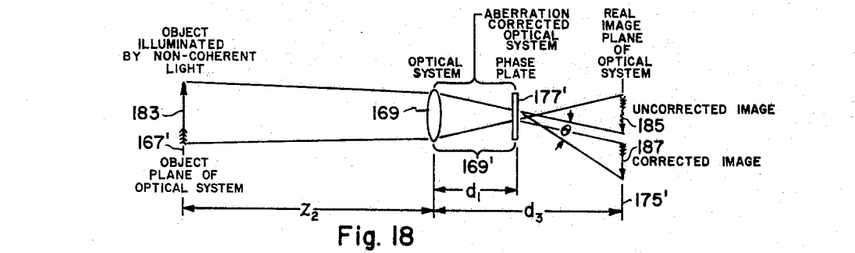
FIG. 18 is a diagram showing a corrected optical system by using the phase plate produced by the method illustrated in FIG. 17.

After the photographic plate 177 is developed, the hologram or phase plate 177' is replaced in substantially its original position with respect to the optical system 169, i.e., at a distance $d_1$ from the optical system 169, as shown in FIG. 18. With the phase plate 177' in position, any object 183 placed in the object plane 167' at a distance $z_2$ from the optical system will form an uncorrected real image 185 in the conventional system and a corrected real image 187 in an off-axis position by the angle $\theta$. The real image plane 175' will be located at a distance $d_3$, depending on the distance $z_2$. The light for illuminating the object 183 may be of any type that would ordinarily be used for the optical system 169 and, of course, need not be coherent light. The phase plate 177' has the recorded aberration "patterns" of the optical system 169 and these "patterns" diffract the light from the optical system to the off-axis position, omitting the aberrations. The phase plate 177' can now be considered a part of the optical system 169 to form an aberration-corrected optical system 169'.

It will be understood, of course, that while the forms of the invention herein shown and described constitute the preferred embodiments of the invention, it is not intended herein to illustrate all of the possible equivalent forms or ramifications of the invention. It will be understood that the words used are words of description rather than of limitation, and that various changes, such as changes in shape, relative size, and arrangement of parts or steps may be substituted without departing from the spirit or scope of the invention herein disclosed.

What is claimed is:

1. A method of producing one or more images of an object comprising the steps of:
   (a) directing coherent radiation onto an object to provide an object-bearing beam;
   (b) positioning a detector sensitive to said coherent radiation in the path of said object-bearing beam;
   (c) directing radiation coherent with said first-named coherent radiation as a reference beam onto the detector at a finite angle with respect to said object-bearing beam to produce therewith a pattern of interference fringes on the detector;
   (d) illuminating the pattern on the detector with coherent radiation as an illuminating beam, thereby producing an image of the object; and
   (e) detecting said image of the object along an axis angularly displaced from the illuminating beam.

2. A method of producing one or more images of an object comprising the steps of:
   (a) directing coherent radiation onto a diffusion screen and then onto an object to provide an object-bearing beam;
   (b) positioning a detector sensitive to said coherent radiation in the path of said object-bearing beam;
   (c) directing radiation coherent with said first-named coherent radiation as a reference beam onto the detector at a finite angle with respect to said object-bearing beam to produce therewith a pattern of interference fringes on the detector; and
   (d) illuminating the pattern on the detector with coherent radiation as an illuminating beam, thereby producing an image of the object.

3. A method of producing a photographic print comprising the steps of:
   (a) directing coherent radiation onto an object to provide an object-bearing beam;
   (b) positioning a detector sensitive to said coherent radiation at a distance spaced from the object and in the path of said object-bearing beam;
   (c) directing radiation coherent with said first-named coherent radiation as a reference beam onto the detector at a finite angle with respect to said object-bearing beam to produce therewith a pattern of interference fringes on the detector;
   (d) illuminating the pattern on the detector with coherent radiation as an illuminating beam, thereby producing a real image of the object; and
   (e) detecting said real image of the object by positioning a photosensitive material at said distance from said detector and at substantially the same angle as said reference beam makes with said object-bearing beam, whereby said photosensitive material has projected thereon the real image of said object.

4. A method of producing one or more images of an object comprising the steps of:
   (a) directing coherent radiation onto an object to provide an object-bearing beam;
   (b) positioning photosensitive means in the path of said object-bearing beam;
   (c) directing radiation coherent with said first-named coherent radiation as a reference beam onto said photosensitive means at a finite angle with respect to said object-bearing beam to produce therewith a pattern of interference fringes on said phososensitive means;
   (d) developing said photosensitive means;
   (e) illuminating the developed photosensitive means with coherent radiation as an illuminating beam, thereby producing an image of the object; and
   (f) detecting said image of the object along an axis angularly displaced from the illuminating beam.

5. A method of producing 3-dimensional images comprising:
   (a) directing a coherent source of light for illuminating a 3-dimensional object, said object reflecting light in accordance with the function $s(x,y)$;
   (b) positioning detection means responsive to said coherent source of light to receive reflected from said object in accordance with function $s_o(x, y)$;
   (c) deflecting a portion of light from said coherent source onto detection means in accordance with the function $a_o e^{j\alpha x}$;
   (d) said detection means receiving and recording both components of light to produce thereon a pattern of interference fringes in effect as $$a_o^2 + a^2 + a_o a e^{j(\alpha x - \phi)} + a_o a e^{-j(\alpha x - \phi)};$$

and
   (e) illuminating the pattern on said detection means with said coherent source of light and producing a new distribution of light corresponding to $a_o^2$, $a^2$, $a_o a e^{j(\alpha x - \phi)}$, and $a_o a e^{-j(\alpha x - \phi)}$, whereby $a_o^2 + a^2$ produces the conventional reconstruction, $a_o a e^{j(\alpha x - \phi)}$ produces a real image, and $a_o a e^{-j(\alpha x - \phi)}$ produces a virtual image, said conventional reconstruction and images being spatially separated; where the light reflected by the object is a function of $x$ and $y$; the detection means receives the light in accordance with the function $S_o$ of $x$ and $y$;

the function $S_o(x, y)$ is a complex quantity having both amplitude and phase, the polar form of which is $$S_o(x, y) = a(x, y) e^{j\phi(x, y)}$$

where $a$ is the amplitude modulus and $\phi$ is the phase of the impinging light; $a_o$ is the amplitude modulus of said portion of light and the phase term $e^{j\alpha x}$ results from said portion of light impinging on said detection means at a finite angle.

6. A method of producing a hologram comprising:
   (a) illuminating an object with a source of coherent radiation to produce reflected radiation from said object;
   (b) positioning a detector sensitive to said coherent radiation to receive the reflected radiation from said object; and
   (c) directing reference radiation coherent with said first-named coherent radiation onto the detector in such manner to interfere with the reflected radiation from said object, said directed reference radiation interfering with said reflected radiation to produce a pattern of interference fringes that are recorded on said detector.

7. A method of producing a hologram comprising the steps of:
   (a) illuminating an object with a source of coherent light to provide a an object-bearing beam reflected from said object;

(b) positioning a detector at a distance spaced from said object to receive the reflected light from said object; and (c) positioning deflector means with respect to said detector for deflecting light coherent with said first-named source of coherent light through a finite angle with respect to the object-bearing beam into said detector, said deflected light interfering with said reflected light to produce a pattern of interference fringes on said detector.

8. A method of reconstructing one or more images of an object recorded as a hologram produced from a pattern of interference fringes resulting from the combination of an object-bearing beam of coherent radiation and a reference beam coherent therewith and angularly displaced with respect to each other at a finite angle comprising the steps of:

(a) illuminating the hologram with coherent radiation as an illuminating beam, thereby producing an image of the object; and (b) detecting said image of the object along an axis displaced from the illuminating beam by an angle corresponding substantially to the angular displacement between the object-bearing beam and the reference beam when said hologram was produced.

9. A method of producing a photographic print from the real image of an object recorded as a hologram produced from a pattern of interference fringes resulting from the combination of an object-bearing beam of coherent radiation and a reference beam coherent therewith and angularly displaced with respect to each other at a finite angle, comprising the steps of:

(a) illuminating the hologram with coherent light as an illuminating beam, thereby producing a real image of the object; and (b) positioning photosensitive material along an axis displaced from the illuminating beam by an angle corresponding substantially to the angular displacement between the object-bearing beam and the reference beam when said hologram was produced.

10. A method of magnifying the real image size of an object, comprising the steps of:

(a) directing a diverging beam of coherent radiation onto an object to provide an object-bearing beam;

(b) positioning a detector sensitive to said coherent radiation in the path of said object-bearing beam;

(c) directing a diverging beam of radiation coherent with said first-named coherent radiation as a reference beam onto the detector at a finite angle with respect to said object-bearing beam to produce therewith a pattern of interference fringes on the detector;

(d) illuminating the pattern on the detector with a diverging beam of coherent light as an illuminating beam, thereby producing a real image of increased size of the object; and (e) detecting said image of increased size along an axis angularly displaced from the illuminating beam.

11. A method of magnifying the real image size of an object, comprising the steps of:

(a) illuminating an object with a diverging beam of coherent light positioned at a distance $z_1$ from the source of said diverging beam of coherent light;

(b) positioning a detector at a distance $z_2$ from said object to receive the Fresnel diffraction patterns of the illuminated object;

(c) deflecting a portion of said diverging beam of said coherent light into said detector to cooperate with said Fresnel diffraction patterns from the object to form interference patterns on said detector to produce a hologram;

(d) illuminating said hologram with a diverging beam of coherent light as an illuminating beam said hologram being positioned at a distance $z_a$ from the source of said coherent beams of diverging light and producing a real image at a distance $z_b$ from said hologram whereby the magnification of said real image as compared to said object is M and $M = M_1 M_2$ where $$M_1 = \frac{z_2 + z_1}{z_1}$$

and $$M_2 = \frac{z_a + z_b}{z_a}$$

(e) detecting said magnified real image along an axis angularly displaced from the illuminating beam.

12. A method of storing information comprising the steps of:

(a) illuminating a first portion of a total amount of information with a source of coherent radiation to provide an object-bearing beam;

(b) positioning a detector sensitive to said coherent radiation in the path of said object-bearing beam;

(c) directing radiation coherent with said first-named coherent radiation as a reference beam onto the detector at a finite angle with respect to said object-bearing beam to produce therewith a pattern of interference fringes forming a first diffraction grating;

(d) illuminating a second portion of said total amount of information with coherent radiation to provide a second object-bearing beam;

(e) maintaining said detector in the path of said second object-bearing beam; and (f) directing radiation coherent with said coherent radiation of step (d) as a second reference beam onto said detector at a finite angle with respect to said second object-bearing beam to produce a second pattern of interference fringes on the detector forming a second diffraction grating, each of said finite angles having a different spatial relation with respect to said detector, whereby said second diffraction grating has an orientation different from said first diffraction grating.

13. A method of retrieving information from a complex hologram comprising a plurality of holograms superimposed on a common detector wherein each hologram was formed by positioning photosensitive means relative to an object to receive an object-bearing beam of coherent radiation and a reference beam coherent therewith deflected onto the photosensitive means at a finite angle with respect to the object-bearing beam to produce therewith a pattern of interference fringes in the form of a hologram on said photosensitive means, said finite angle for each hologram having a different spatial relation with respect to the common detector comprising the steps of:

(a) illuminating the developed complex hologram with a source of coherent light as an illuminating beam to produce a plurality of image-carrying beams; and (b) positioning means for detecting the image formed by each image-carrying beam, said illuminating beam and each image-carrying beam having an angular displacement corresponding to the angle that the reference beam made with the object-bearing beam during the production of each hologram of said complex hologram.

14. A method of producing 3-dimensional images in accordance with claim 4 comprising:

(a) positioning sequentially a plurality of 3-dimensional objects in said first-named coherent radiation to provide a plurality of object-bearing beams received by said photosensitive means;

(b) directing radiation coherent with said first-named coherent radiation as reference beams sequentially onto said photosensitive means at finite angles with respect to the corresponding object-bearing beams to produce therewith a pattern of interference fringes on said photosensitive means for each of said plurality of objects, said reference beams being directed onto said photosensitive means at a different angle for each of said plurality of objects;

(c) developing said photosensitive means; and (d) illuminating the developed photosensitive means with coherent radiation as an illuminating beam, thereby producing a 3-dimensional virtual image and a 3-dimensional real image for each of said plurality of objects.

15. A method of producing color images comprising the steps of:

(a) illuminating an object having at least two dimensions with a plurality of sources of coherent light, each source of coherent light being of a different color to produce an object-bearing beam of each color;

(b) positioning a detector sensitive to each color of said coherent light in the path of said object-bearing beam;

(c) directing light coherent with each color of said coherent light onto said detector at finite angles with respect to the corresponding object-bearing beams to form interference patterns on said detector, said directed light of each color of coherent light being directed onto said detector at a different angle; and (d) illuminating said interference patterns on said detector with each color of coherent light directed at the same angle as said directed light of corresponding color, whereby an image from each color is superimposed to produce an image of combined colors.

16. A method of lenslessly producing color images with black and white photosensitive material, comprising the steps of:

(a) illuminating an object having at least two dimensions with at least three sources of coherent light, each source of coherent light being of a different color and balanced with respect to each other than when combined produce white light;

(b) positioning a black and white photosensitive material to receive light from the illuminated object;

(c) directing light coherent with each different color of light onto said photosensitive material to cooperate with the corresponding color of light from the illuminated object to form interference patterns on said photosensitive material, said directed light of each color of coherent light being directed onto said photosensitive material at a different angle;

(d) developing said photosensitive material, and (e) illuminating said developed photosensitive material with only the directed light of each color of the coherent light, said developed photosensitive material being oriented with respect to said directed light of each color of coherent light in the same manner as it was when exposed, whereby a virtual image from each color is superimposed to produce a single virtual image having coloring identical to said object.

17. A method of producing color images in accordance with claim 15 wherein the color of the superimposed image is changed by selectively changing the orientation of at least one color of the coherent light illuminating said interference patterns on said detector.

18. A method of producing color images in accordance with claim 15 wherein the color of the superimposed image is changed by adding additional illuminating light of a selected color and directed at a selected angle on said interference patterns on said detector.

19. The method of producing aberration-corrected images in optical systems comprising the steps of:

(a) passing coherent light through an optical system to provide an object-bearing beam;

(b) positioning photosensitive means to receive said object-bearing beam, said photosensitive means being positioned between the optical system and the plane of the real image formed by the optical system;

(c) directing a portion of said coherent light around said optical system and onto said photosensitive means to produce with said object-bearing beam a pattern of interference fringes on said photosensitive means;

(d) developing said photosensitive means to provide a phase plate;

(e) repositioning the phase plate with respect to the optical system in substantially the same position at which the photosensitive means was exposed to the coherent light, said optical system and said phase plate combining to form a highly aberration-corrected optical system;

(f) positioning an object in said aberration-corrected optical system;

(g) directing an illuminating beam of light onto said object and through said aberration-corrected optical system to produce an aberration-corrected image of said object; and (h) detecting said aberration-corrected image of said object along an axis angularly displaced from the illuminating beam.

20. A method of producing images comprising:

(a) positioning sequentially a plurality of objects in coherent radiation to provide a plurality of object-bearing beams received by a photosensitive means;

(b) directing radiation coherent with said first-named coherent radiation as reference beams sequentially onto said photosensitive means at finite angles with respect to the corresponding object-bearing beams to produce therewith a pattern of interference fringes on said photosensitive means for each of said plurality of objects, said reference beams being directed onto said photosensitive means at a different angle for each of said plurality of objects; and (c) illuminating said patterns on said photosensitive means with coherent radiation as an illuminating beam, thereby producing an image for each of said plurality of objects.

21. A method according to claim 2 wherein the object is a 3-dimensional object and said illuminating beam comprises coherent light, whereby illumination of said detector produces a 3-dimensional image of the object.

22. The method of storing information according to claim 12 comprising:

(g) repeating steps (d), (e) and (f) of claim 12 with respect to the additional portions of said information to provide a plurality of object-bearing beams and corresponding reference beams for each object-bearing beam to form a complex hologram comprising a plurality of diffraction gratings on said detector, whereby a diffraction grating is produced for each portion of information and each diffraction grating having a different orientation from the other diffraction gratings on said detector.

23. A method of producing a hologram comprising:

(a) directing a first beam of radiation through a diffusion screen onto an object from a source of coherent radiation;

(b) positioning a detector to receive the radiation from said object; and (c) directing a second beam of radiation onto said detector from said source at a finite angle with respect to said radiation from said object, said second beam interfering with said radiation from said object to produce therewith a pattern of interference fringes that are recorded on said detector.

24. A method of producing a color hologram comprising the steps of:

(a) illuminating an object having at least two dimensions with a plurality of sources of coherent light, each source of coherent light being of a different color to produce an object-bearing beam of each color;

(b) positioning a detector sensitive to each color of said coherent light in the path of said object-bearing beam; and (c) directing light coherent with each color of said coherent light onto said detector at finite angles with respect to the corresponding object-bearing beams to form interference patterns on said detector, said directed light of each color of coherent light being directed onto said detector at a different angle.

References Cited

UNITED STATES PATENTS

| | | | |
|---|---|---|---|
| 2,492,738 | 12/1949 | Gabor | 250—49.5 |
| 2,770,166 | 11/1956 | Gabor | 88—39 |
| 3,083,615 | 4/1963 | El-Sum | 88—24 |

OTHER REFERENCES

Leith, E. N., et al. "Journal of the Optical Society of America," vol. 52, No. 10, October 1962, pp. 1123–1130.

Schawlow, A. L., "Scientific American," vol. 204, No. 6, June 1961, pp. 52–61.

Cutrona, L. J., et al., "IRE Transactions on Information Theory," June 1960, pp. 386–400.

NORMAN A. TORCHIN, Primary Examiner

R. H. SMITH, Assistant Examiner

U.S. Cl. X.R.

96—27